Dec. 19, 1967  D. H. SILVERN  3,358,508
PRIMARY METERING DEVICE
Filed July 1, 1965

INVENTOR
DAVID H. SILVERN
BY
Cameron, Kerkam & Sutton
ATTORNEYS

United States Patent Office 3,358,508
Patented Dec. 19, 1967

3,358,508
PRIMARY METERING DEVICE
David H. Silvern, Olean, N.Y., assignor to Dresser Industries, Inc., Dallas, Tex., a corporation of Delaware
Filed July 1, 1965, Ser. No. 468,862
5 Claims. (Cl. 73—261)

ABSTRACT OF THE DISCLOSURE

A positive displacement gas meter having intermeshing lobe type rotors which are rotated by the flow of gas through the meter. An electric driving motor has its output shaft directly connected to one of the meter rotors. A control circuit is provided for manually setting the power supplied to the motor, so as to supply just sufficient torque to the rotors to overcome the mechanical friction resisting rotation of the rotors. The motor is designed to have a flat torque output over its operating speed range; or at least over the lower twenty percent of the operating speed range. With this arrangement there is no pressure drop across the meter, and therefore no leakage, as a result of mechanical friction.

---

Figure 1:
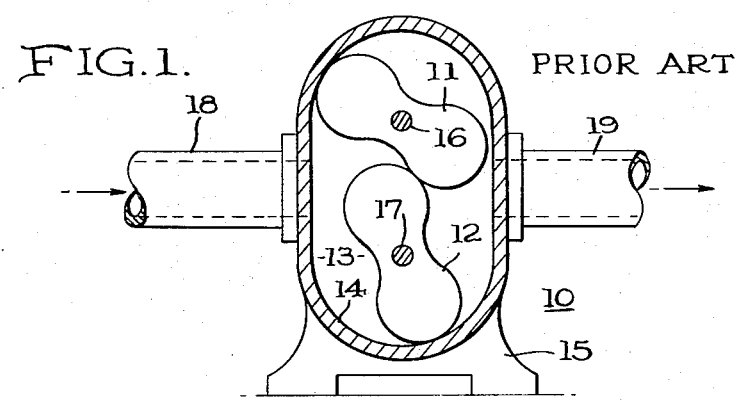

The present invention relates generally to fluid measuring devices, and more particularly to an arrangement for increasing the proof or accuracy of a primary fluid meter of the rotary positive displacement type.

Positive displacement meters usually employ multi-lobe intermeshing rotors or impellers which are rotatably mounted within a casing and geared together so that a certain definite volume of fluid, which furnishes the torque for turning the impellers, is entrapped between the lobes of the impellers and advances through the meter upon each rotation of the impellers. The total volume of fluid passing through the meter is measured and recorded by a suitable counting mechanism connected to the shaft of one of the impellers.

With meters of this type, the impellers do not actually touch each other or the casing, but a small operating clearance is maintained in order that the rotary members may rotate freely under a relatively small differential pressure between the inlet and outlet sides of the meter. Even though these clearances are maintained very close, such meters are inherently inaccurate due to leakage through the clearances. The amount of leakage is a function of the differential pressure, and, since the differential pressure is a function of the frictional resistance to rotation of the impellers offered by the bearings, leakage is also a function of friction. However, only a portion of the pressure drop through such a meter is due to frictional forces, there being a substantial pressure drop due to the inertia of the gas being accelerated through the meter.

Various attempts have been made heretofore to overcome leakage in fluid meters by means which are responsive to the pressure differential across the meter. Known arrangements generally include means for by-passing a portion of the flow of fluid from the inlet to the outlet of the meter and utilizing the by-passed fluid to actuate a device which drives the rotary members in response to the differential pressure. Such attempted solutions of the problem are inadequate since they rely upon the establishment of a flow of fluid around the meter when the pressure at the inlet increases beyond a predetermined value, with the result that fluid which would otherwise flow through the meter and be measured is, instead, diverted around it and unmeasured.

Another inadequacy of known arrangements resides in the fact that a device which compensates for the entire pressure drop due to both friction and inertia throughout the operating range of the meter will cause, at high flow rates, a backward flow through the meter clearances, destroying the accuracy of the meter in the high flow region. This is so because at low flow rates the inertial effect of the fluid being accelerated through the meter is insignificant, while at maximum flow rates the pressure drop due to inertia of the fluid is approximately 40 times the frictional drop.

In gas meter installations, the frictional resistances of the meter bearings and counting mechanism contributing to leakage of the fluid past the impellers presents the greatest problem at low rates of flow, since at low flow rates it is possible for a greater percentage of the gas to flow through the clearances without generating enough force to overcome the inherent friction of the rotors. At high flow rates, this lost volume flow is an insignificant percentage of the total flow, whereas at flows below 10% of the maximum flow rate the lost flow becomes a substantial percentage of the total flow.

The primary object of the present invention is to overcome the disadvantages of prior art devices by providing a primary metering device of the rotary positive displacement type having a proof or accuracy of 100% throughout its entire range of operation.

Another object is to provide an improved fluid meter having an increased accuracy under low flow conditions.

A further object of the invention is to provide a rotary positive displacement meter of novel construction which presents little or no resistance to the flow of low pressure fluids therethrough.

To this end, there is provided, integral with the meter, a small motor arranged to drive the impellers so as to compensate for the frictional resistances of the meter at very low speeds. The meter housing includes a window which permits the meter gear mechanism to be readily observed, and the motor torque is adjusted, under no flow conditions, to just overcome the frictional effects of the bearings and counting mechanism. Such an arrangement permits the primary metering device to be readily checked and adjusted, if necessary, before and after each run to compensate for changes in frictional forces which might occur over a period of time and destroy the accuracy of the meter. In addition, such an arrangement provides an extremely compact structure which is simple and highly efficient in operation.

Figure 2:
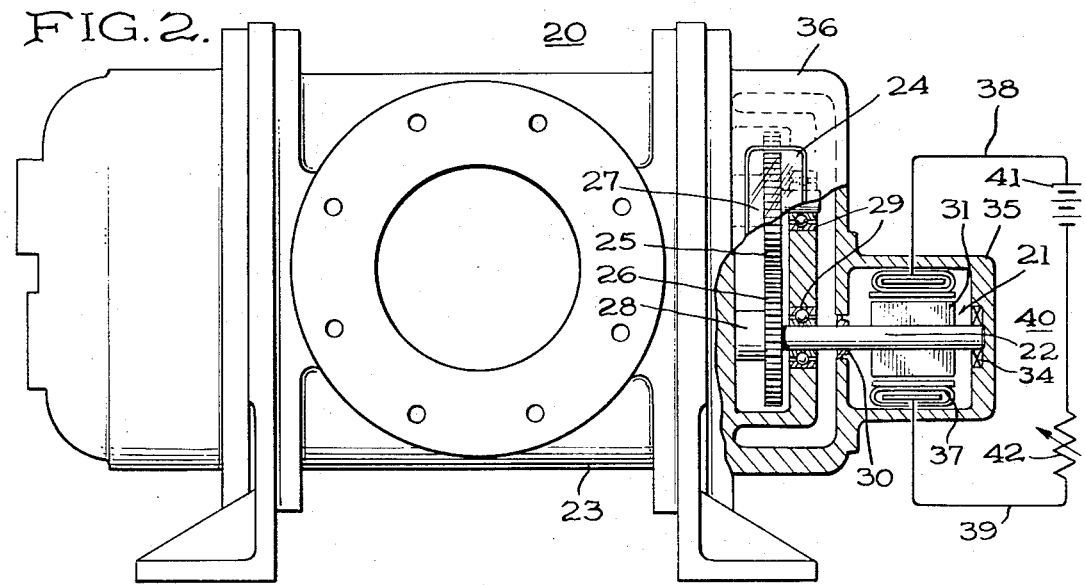
Figure 3:
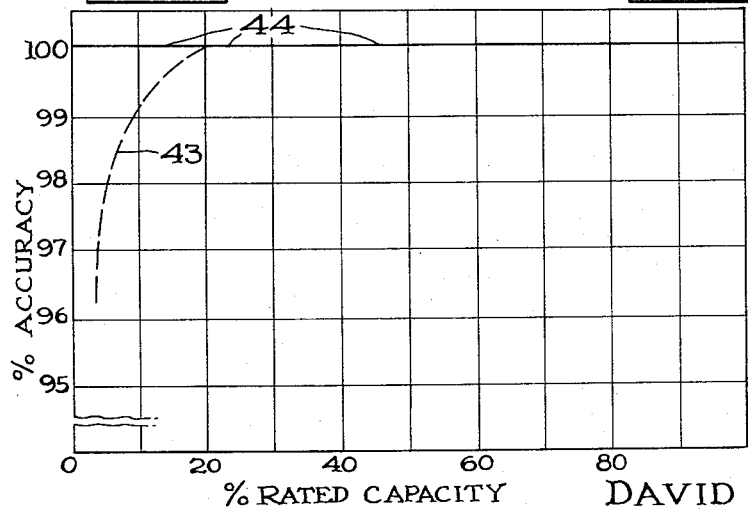

These and other features of the invention will appear more fully from the following detailed description of the mechanical structure and mode of operation of one form of meter embodying the inventive concept. While the specification concludes with claims particularly pointing out and distinctly claiming the subject matter of the present invention, it will now be described with reference to the accompanying drawing wherein:

FIG. 1 is an end elevational view, partly in cross-section, of a conventional fluid meter of the rotary positive displacement type;

FIG. 2 is a side elevational view, partly in cross-section, of one example of a rotary positive displacement meter embodying the present invention, particularly illustrating the arrangement of electric motor drive means for compensating for the frictional resistances of the meter at low flow rates; and FIG. 3 is a graphical comparison of the proof curve of a meter embodying the present invention with that of a conventional prior art meter.

Referring to the drawing, there is shown in FIG. 1 a typical rotary positive displacement gas meter 10 which comprises two multi-lobe rotors or impellers 11 and 12 supported for rotation within a chamber 13 formed by the inner walls of the surrounding casing 14 and provided with a suitable supporting base 15. The rotors 11 and 12 are mounted on parallel shafts 16 and 17, respectively, which are geared together in a manner well known in the art so that the rotors rotate in opposite directions in timed relation.

The contour and finish of the rotors and the accuracy of cut of the gears is such that a small operating clearance of a few thousandths of an inch is maintained between the rotors as they rotate. The surrounding walls of casing 14 conform to the path described by the ends of the rotor lobes, and are otherwise so shaped that a small operating clearance of a few thousandths of an inch or less is also provided between the casing walls and the rotors.

Flow of gas to be measured is in the direction of the arrows, or from left to right as shown in FIG. 1, and is effected by supplying gas under pressure to the gas inlet line 18 which is connected to the inlet side of the meter 10. A gas outlet line 19 is provided from the outlet side of the meter for supplying the metered gas to a burner or other gas using device. A read-out or counting mechanism (not shown) is suitably connected to one of the shafts 16 and 17 to count the number of revolutions of the rotors which are then calibrated to volume flow through the meter. Since various types of counting mechanisms well known in the art may be utilized, this portion of the meter is not described in detail herein.

Thus far, there has been described a conventional rotary positive displacement gas meter wherein the energy necessary to overcome the resistance to running of the meter, such as bearing friction, gearing friction and the friction of the counting mechanism, is supplied directly to the rotors by the gas being measured. The actual speed of rotation therefore varies from the theoretical frictionless speed of rotation at all speeds of the meter, but the variation is proportionally greater at low flow rates through the meter. The variation is particularly significant in gas meter installations, since the flow energy of the gas necessary to overcome the resistance to running is large in proportion to the total amount of energy available from the gas flow, particularly at low flow rates.

Referring now to FIG. 2, there is shown therein a rotary positive displacement gas meter 20 embodying the present invention, which is similar in many respects to the conventional meter of FIG. 1, but is modified to include a meter driving electric motor 21 having its shaft 22 formed as an integral extension of one of the rotor shafts of the meter. In the construction illustrated, the rotor shafts 27 and 28 are journaled in bearings 29 carried by the end cover 36 of the meter housing 23, and are provided with timing gears 25 and 26, respectively, which are maintained in engagement with one another to effect synchronized rotation of the rotors in the usual manner. The end cover 36 is provided with a window 24 through which rotation of the gears 25 and 26 may be observed for the purpose hereinafter described. It will also be understood that either of rotor shafts 27 and 28 may be connected to a counting mechanism (not shown) calibrated to indicate volume flow through the meter.

As mentioned above, the shaft 22 of meter driving motor 21 is integral with one of the rotor shafts, shaft 28 in the embodiment shown, and extends through a suitable sealed opening 30 in end cover 36 into motor housing 35 which is provided with a bearing 34 for the outer end of shaft 22. The rotor winding 31 of motor 21 is supported on shaft 22 within housing 35 which may advantageously be cast integrally with the end cover 36, or may be separately secured thereto in any suitable manner. In either case, the field coil 37 of the motor 21 is accurately positioned over the rotor winding 31 to provide driving torque from the motor to the meter rotors upon proper excitation of the field coil 37.

To this end, field coil 37 is connected through conductors 38 and 39 to a control circuit 40 comprising a voltage source 41 and a serially connected variable resistor 42. The resistance of resistor 42 is variable so that the excitation of the field coil may be varied to so adjust the output of the motor that the torque applied to motor shaft 22 just overcomes the friction of the bearings, gears and counter at low flow rates, and thus compensates for the pressure drop across the meter so as to eliminate the lost volume flow at low flow conditions.

In operation, at no flow conditions, the resistor 42 is manually adjusted so that the motor output torque applied to shaft 22 and gear 26 is just sufficient to cause the rotors to turn at a low, but constant, r.p.m. Setting the motor output torque can be accomplished through visual observation of the gears 25 and 26 through window 24. Although window 24 is shown positioned over the gear mechanism, it may also be placed in the housing 23 to observe rotation of the rotors directly. It should be apparent that, by increasing the motor output until the meter rotors just start to turn and by maintaining the output to provide a low, but constant, speed of rotation, the retarding force of the meter due to friction is overcome by the driving force of the motor, rather than by the energy of the flowing gas. The actual speed of rotation will therefore be effectively equal to the theoretical frictionless speed of rotation at all speeds of the meter; and since meter losses are counteracted, a proof of accuracy of 100% is obtained.

The motor 21 is preferably so designed as to have a flat torque output over the entire r.p.m. range of the meter so that accuracy will be maintained over the entire flow range. However, since the lost volume flow becomes more and more insignificant as the flow rate is increased, it is not absolutely necessary that the torque characteristic of the motor be flat over the entire range. At rotational speeds above approximately 20% of the rated maximum r.p.m. of the meter, the lost volume flow approaches a tolerable limit as respects accuracy of the meter such that, even if the motor produces a small negative torque at high r.p.m., a satisfactory accuracy would still be maintained over the entire range. Consequently, the motor need only be adjusted to overcome the retarding force at very low r.p.m., as long as it has a reasonably flat torque versus r.p.m. characteristic at speeds below 20% of the rated capacity of the meter.

FIG. 3 graphically illustrates the effect of the present invention when the rotors of the meter are so driven by the motor that the rotors just start to turn without any flow of gas through the meter, as hereinbefore described. The broken line 43 represents a typical proof curve for a meter operated without a friction compensating drive motor, while the solid line 44 represents a proof curve for the same meter when operated in accordance with the present invention.

It can readily be seen that at flow rates of less than 20% of full capacity the proof of accuracy, which is the ratio of measured flow to actual flow, is maintained near 100% with the embodiment of the present invention, while in the prior art device the proof decreases sharply below 20%, the accuracy being approximately 99% at 10% flow rate and being completely inaccurate at flow rates less than 5% of capacity.

From the foregoing description, it is apparent that there has been provided by the present invention a primary metering device which is extremely accurate over the entire flow rate range, and which provides a simple and effective method for observing the operation of the meter and compensating for the frictional forces therein. The meter can be quickly and reliably checked before and after each run of the meter so as to insure an exceedingly accurate measuring device at all times. Although only one specific embodiment of the invention has been described and illustrated, it will be obvious to those skilled in the art that various modifications may be made, and it is therefore intended by the appended claims to cover all such modifications which fall within the true scope of the invention.

What is claimed is:

1. A primary metering device comprising a casing having an inlet and an outlet; at least one rotatable element in said casing adapted to be rotated by the flow of fluid therethrough from said inlet to said outlet;

an electric motor connected to said element in driving relation; said motor having a constant torque output over its operating speed range;

and manually controllable means for adjusting the power supplied to said motor whereby, with no flow through said metering device, the motor just starts to turn said rotatable element and continues to drive said rotatable element at a constant low speed of rotation to overcome the frictional resistance to rotation of said element.

2. A primary metering device as set forth in claim 1 wherein said motor has a constant torque output over the lower twenty percent of its operating speed range.

3. A primary metering device as set forth in claim 1 wherein said rotatable element has a shaft extending outwardly of said casing; and wherein said electric motor has its rotor mounted on said shaft.

4. A primary metering device as set forth in claim 1 wherein said casing is provided with a window for observing the rotation of said rotatable element, whereby the power input to said electric motor can be adjusted to just turn said element and rotate said element at a constant low speed of rotation as observed through said window.

5. A primary metering device as set forth in claim 1 wherein said rotatable elements are defined by a pair of multilobe impellers mounted in said casing on shafts having intermeshing gears whereby said impellers are adapted to be rotated in timed relation by the flow of fluid through said casing from said inlet to said outlet.

References Cited
UNITED STATES PATENTS

| | | | |
|---|---|---|---|
| 1,797,233 | 3/1931 | Huebotter | 73—261 |
| 1,922,071 | 8/1933 | Bassett | 73—232 |
| 2,621,516 | 12/1952 | Zavoico | 73—232 |

RICHARD C. QUEISSER, *Primary Examiner.*

E. D. GILHOOLY, *Examiner.*